(12) United States Patent
Deno et al.

(10) Patent No.: US 11,919,095 B2
(45) Date of Patent: Mar. 5, 2024

(54) LATHE (71) Applicant: STAR MICRONICS CO., LTD., Shizuoka (JP)

(72) Inventors: Masatoshi Deno, Shizuoka (JP); Daisuke Suzuki, Shizuoka (JP)

(73) Assignee: STAR MICRONICS CO., LTD., Shizuoka (JP)

( * ) Notice: Subject to any disclaimer, the term of this patent is extended or adjusted under 35 U.S.C. 154(b) by 652 days.

(21) Appl. No.: 17/032,112

(22) Filed: Sep. 25, 2020

(65) Prior Publication Data
US 2021/0008641 A1 Jan. 14, 2021

Related U.S. Application Data (63) Continuation of application No. PCT/JP2018/048030, filed on Dec. 27, 2018.

(30) Foreign Application Priority Data

Apr. 20, 2018 (JP) ................. 2018-081771

(51) Int. Cl.
*B23B 7/06* (2006.01)
*B23B 31/20* (2006.01)
(Continued)

(52) U.S. Cl.
CPC ............ *B23B 7/06* (2013.01); *B23B 31/2072* (2021.01); *B23B 31/265* (2013.01);
(Continued)

(58) Field of Classification Search
CPC . B23B 31/2072; B23B 31/265; B23B 31/001; B23Q 11/005; B23Q 11/0883;
(Continued)

(56) References Cited

U.S. PATENT DOCUMENTS 2,272,185 A 2/1942 Chittenden
4,602,798 A * 7/1986 Wettstein ............ B23B 31/2073
279/42

(Continued)

FOREIGN PATENT DOCUMENTS

CN 203061901 7/2013
CN 203448683 2/2014
(Continued)

OTHER PUBLICATIONS

JPH0639303, Sato, Oct. 26, 1992, Lathe, 9 pages.*
(Continued)

*Primary Examiner* — Eric A. Gates
*Assistant Examiner* — Reinaldo A Vargas Del Rio
(74) *Attorney, Agent, or Firm* — LEX IP MEISTER, PLLC (57) ABSTRACT

Provided is a lathe capable of shortening the spindle. The lathe comprises a spindle, a spindle support which supports the spindle through a bearing on an outer side of the spindle, a collet disposed on a front end of the spindle, an inner ring holder provided on the spindle to hold a front of an inner ring of the bearing, an outer ring holder provided on the spindle support to hold a front of an outer ring of the bearing, a cap screwed into the spindle in front of the inner ring holder, and a cover detachably provided on the spindle support side. The cover has an inner circumferential surface facing an outer circumferential surface of the cap. A first air purging unit is provided between the inner circumferential surface of the cover and the outer circumferential surface of the cap.

16 Claims, 8 Drawing Sheets

(51) Int. Cl.
  *B23B 31/26* (2006.01)
  *B23Q 11/00* (2006.01)
  *B23Q 11/08* (2006.01)
  *B23B 31/00* (2006.01)
(52) U.S. Cl.
  CPC ........ *B23Q 11/005* (2013.01); *B23Q 11/0883* (2013.01); *B23B 31/001* (2013.01); *Y10S 279/901* (2013.01)
(58) Field of Classification Search
  CPC ............... B23Q 11/0042; B23Q 11/006; Y10S 279/901; Y10T 279/17299; Y10T 279/17504; Y10T 279/17538
  See application file for complete search history.

(56) References Cited

U.S. PATENT DOCUMENTS

| | | | | |
|---|---|---|---|---|
| 7,673,882 | B2 * | 3/2010 | Tanga | B23B 31/20125 279/42 |
| 8,206,068 | B2 * | 6/2012 | Takashima | B23Q 11/0883 409/231 |
| 10,335,860 | B2 * | 7/2019 | Ishikawa | F16C 29/005 |
| 2017/0274457 | A1 | 9/2017 | Ishikawa | |

FOREIGN PATENT DOCUMENTS

| | | | |
|---|---|---|---|
| CN | 204603317 | | 9/2015 |
| JP | 1994-039303 | | 5/1994 |
| JP | H0639303 U | * | 5/1994 |
| JP | H08-215907 | | 8/1996 |
| JP | 2000-18395 | | 1/2000 |
| JP | 2001-96438 | | 4/2001 |
| JP | 2009-85340 | | 4/2009 |
| JP | 2009-166165 | | 7/2009 |
| JP | 2009166165 A | * | 7/2009 |
| JP | 2012-016756 | | 1/2012 |
| JP | 2015-66648 | | 4/2015 |
| TW | 201628764 | | 8/2016 |

OTHER PUBLICATIONS

SIPO, Office Action of the corresponding Chinese Patent Application No. 201880085708.8 dated Jul. 29, 2022.
JPO, Office Action of JP 2018-081771 dated Jan. 11, 2022.
EPO, Supplementary European search Report, Application No. 18915610.2, dated Nov. 17, 2021.
TIPO, Office Action of TW 108113598 dated Aug. 19, 2022.

* cited by examiner

LATHE

CROSS-REFERENCE TO RELATED APPLICATION

The present application is a continuation of PCT Application No. PCT/JP2018/048030, filed on Dec. 27, 2018, which claims priority of Japanese Patent Application No. 2018-081771 filed on Apr. 20, 2018. The contents of this application are incorporated herein by reference in their entirety.

BACKGROUND

(a) Field

The present invention relates to a lathe provided with a collet mounted at the front end of a spindle.

(b) Description of the Related Art

A headstock of a lathe is provided with a spindle support on the outer side of a spindle with respect to a spindle axis. The spindle is supported by the spindle support through a bearing. The bearing has an inner ring and an outer ring. The front of the inner ring is held by an inner ring fastening nut screwed into the spindle. The front of the outer ring is held by an outer ring presser mounted on the spindle support. A workpiece holding collet is mounted on the front end of the spindle with a collet cap. The collet cap is screwed into the spindle and disposed on the outer side of the collet with respect to the spindle axis. The collet depends on the workpiece in size. The collet cap is necessarily removed from the spindle when the collet is replaced.

When a guide bush is provided in front of the spindle, the guide bush is attached to a through-hole of a guide bush supporting bed. When the guide bush is not used, a collet cap cover for the outer periphery of the front end of the spindle is mounted on the spindle support to fit the through-hole of the guide bush supporting bed. Japanese Patent Application Publication No. 2015-66648 discloses that a sealing member fixed to the guide bush supporting bed touches the outer circumferential surface of the spindle cover.

When the guide bush is not used, cut chips and lubilicant scattered from the workpiece likely spread over the front end of the spindle. An air purging unit having grooves is provided at the boundary of the inner ring fastening unit and the outer ring presser to prevent the chips and lubricant going into the bearing. Air is supplied to the air purging unit to guard the bearing against the chips and lubricant. The air purging unit comprises a groove connected to an air inlet and a groove connected to an air outlet. The grooves are arranged side by side in the direction of the spindle axis.

SUMMARY

The chips and lubricant scattered on the front end of the spindle is prevented from going to the bearing by providing a longer distance between them in the spindle axis direction or by providing a multiple-stage air purging unit. The multiple-stage air purging unit provided at the boundary of the inner ring fastening nut and the outer ring presser would make the boundary longer in the spindle axis direction and thereby make the spindle longer in that direction. In an apparatus disclosed in Patent Document 1, a sealing member is provided on the outer circumferential surface of the cover but an air purging unit is not provided on the inner side of the cover. It is therefore required to keep a longer distance between the front end of the spindle and the bearing in the spindle axis direction.

The invention discloses a lathe capable of shortening the spindle.

A lathe of the invention comprises:
- a spindle rotatable on a spindle axis,
- a spindle support which supports the spindle through a bearing on an outer side of the spindle with respect to the spindle axis,
- a collet disposed on a front end of the spindle,
- an inner ring holder provided on the spindle to hold a front of an inner ring of the bearing,
- an outer ring holder provided on the spindle support to hold a front of an outer ring of the bearing on an outer side of the inner ring holder with respect to the spindle axis,
- a cap screwed into the spindle in front of the inner ring holder and disposed on an outer side of the collet with respect to the spindle axis,
- a cover detachably provided on the spindle support side, the cover having an inner circumferential surface facing an outer circumferential surface of the cap, and
- a first air purging unit provided between the inner circumferential surface of the cover and the outer circumferential surface of the cap, the first air purging unit being supplied with purge air.

The invention provides a lathe capable of shortening the spindle.

DETAILED DESCRIPTION

Hereinafter, an embodiment of the present invention will be described. The invention is not limited to the exemplary embodiment and the features disclosed herein are not necessarily essential to the invention.

(1) Summary of Inventive Technology

Technology of the invention will be described with reference to FIG. 1 to FIG. 8. The drawings only schematically show an example of the invention. They may have a mismatch to each other due to different magnification in each direction. Each element denoted by a symbol is only an example.

Embodiment 1

A lathe 1 of an embodiment of the invention may comprise a spindle 12, a spindle support 11, a collet 25, an inner ring holder (an inner ring fastener 40), an outer ring holder (an outer ring presser 50), a cap (a collet cap 60), and a cover (a collet cap cover 70). The spindle 12 may be rotatable on a spindle axis AX0. The spindle support 11 may support the spindle 12 through a bearing B0 on an outer side S4 of the spindle 12 with respect to the spindle axis AX0. The collet 25 may be disposed at the front end 13 of the spindle 12. The inner ring holder (40) may be provided on the spindle 12 to hold the front of an inner ring B1 of the bearing B0. The outer ring holder (50) may be provided on the spindle support 11 to hold the front of an outer ring B2 of the bearing B0 on an outer side of the inner ring holder (40) with respect to the spindle axis AX0. The cap (60) may be screwed into the spindle 12 in front of the inner ring holder (40) and disposed on the outer side S4 of the collet 25 with respect to the spindle axis AX0. The cover (70) may have an inner circumferential surface 71 facing an outer circumferential surface 62 of the cap (60). The cover (70) may be detachably mounted on the spindle support 11 side. The lathe 1 may comprise a first air purging unit P1 disposed between the inner circumferential surface 71 of the cover (70) and the outer circumferential surface 62 of the cap (60). The first air purging unit P1 may be supplied with purge air 100.

Figure 8:
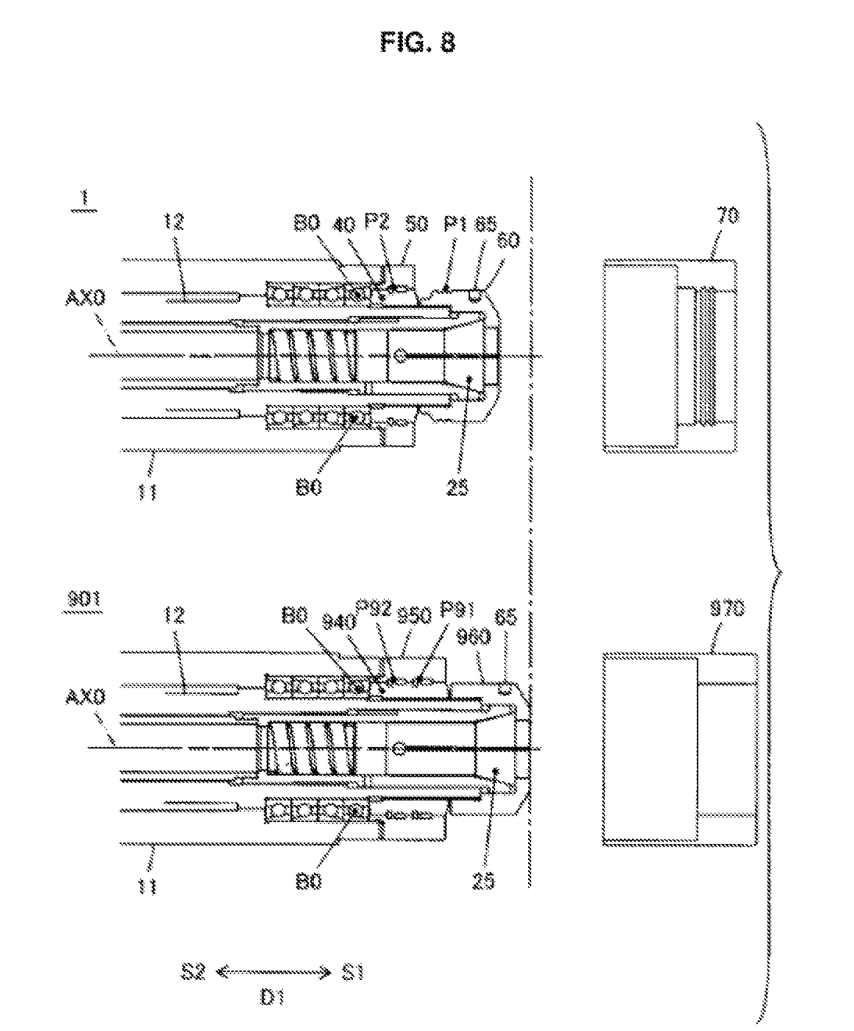
FIG. 8 is a diagram schematically showing an example of a shortened spindle.

FIG. 8 includes a vertical section view of primary part of a lathe 901 of a comparative example where cross-sections are not hatched only for visibility. The lathe 901 comprises the spindle 12, the spindle support 11, the collet 25, an inner ring fastener 940, an outer ring presser 950, a collet cap 960, and a collet cap cover 970. The inner ring fastener 940 is screwed into the outer circumferential surface of the spindle 12 to hold the front of the inner ring of the bearing B0. The outer ring presser 950 is fixed to the front end of the spindle support 11 to hold the front of the outer ring of the bearing B0 on the outer side of the inner ring fastener 940. A first air purging unit P91 and a second air purging unit P92 are disposed between the inner circumferential surface of the outer ring presser 950 and the outer circumferential surface of the inner ring fastener 940. The air purging units P91 and P92 are supplied with purge air. The collet cap 960 is screwed into the outer circumferential surface of the spindle 12 in front of the inner ring holder 940 and disposed on the outer side S4 of the collet 25 with respect to the spindle axis AX0. The collet cap cover 970 has an inner circumferential surface facing an outer circumferential surface of the collet cap 960. The collet cap cover 970 is detachably mounted on the spindle support 11 side. The collet cap cover 970 is inserted to the through-hole of the guide bush supporting bed when the guide bush is not used to prevent the intrusion of chips and lubricant into the headstock 10 from between the through-hole and the outside of the collet cap cover 970.

The chips and lubricant scattered over the front end of the collet cap cover 970 passes through the inside of the collet cap cover 970 to move toward the bearing B0. A single-stage air purging unit would not be enough to block large amount of chips and lubricant. Multiple-stage air purging units P91 and P92 are therefore provided between the outer ring presser 950 and the inner ring fastener 940. The air purging units each comprises a groove connected to the air inlet and a groove connected to the air outlet. The grooves are arranged side by side in the spindle axis direction. Multiple-stage air purging units P91 and P92 arranged in the spindle axis direction D1 makes the holders 940 and 950 longer and thereby makes the spindle 12 longer.

In the embodiment 1 of the invention, however, the air purging unit may be provided between the inner circumferential surface 71 of the cover (70) and the outer circumferential surface 62 of the cap (60) in front of the holders (the inner ring holder 40 and the outer ring holder 50) holding the front of the bearing B0 disposed between the spindle 12 and the spindle support 11. Such configuration can protect the bearing B0 against the chips and lubricant. As shown in upper part of FIG. 8, the need for a longer air purging unit in the spindle axis direction D1 is eliminated, which can make the holders (40, 50) shorter in the spindle axis direction D1. The embodiment therefore provides a lathe capable of shortening the spindle.

The inner ring holder may be a separate member detachabley mounted on the spindle or may be integrally formed with the spindle. The outer ring holder may be a separate member detachabley mounted on the spindle support or may be integrally formed with the spindle support. The cover may be mounted on the spindle support side. That means the the cover may be directly mounted on the spindle support. The cover may be mounted on the outer ring holder. The cover may be mounted on a member mounted on the spindle support. The cap may be a combination of a plurality of parts. The cover may be a combination of a plurality of parts. The above remarks may be applied to the following embodiments.

Embodiment 2

Figure 4:
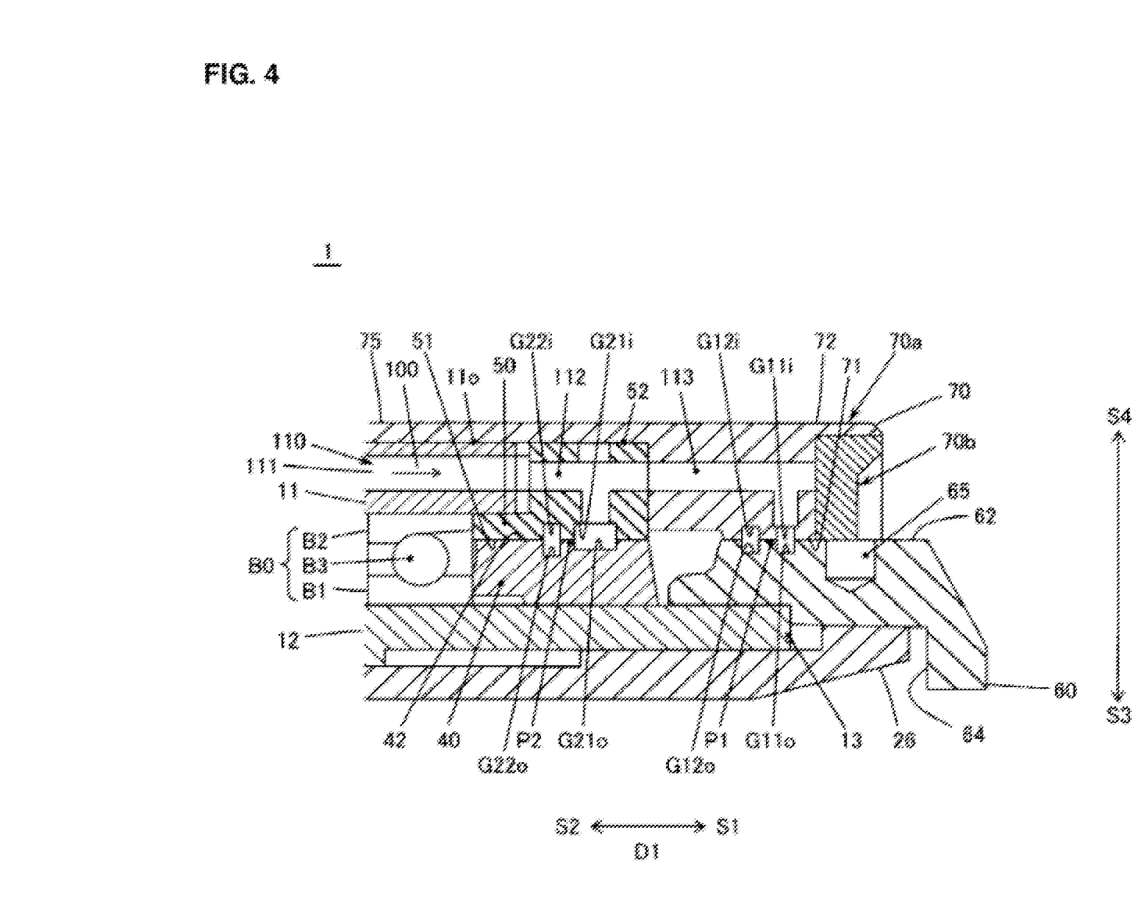
FIG. 4 is a vertical section view of an air purging unit and the surrounding area on an air inlet side.

As shown in FIG. 4, the lathe 1 may comprise a second air purging unit P2 between an inner circumferential surface 51 of the outer ring holder (50) and an outer circumferential surface 42 of the inner ring holder (40). The second air purging unit P2 may be supplied with the purge air 100. Such configuration can effectively protect the bearing B0 against the chips and lubricant since air purging is done between the inner circumferential surface 51 of the outer ring holder (50) and the outer circumferential surface 42 of the inner ring holder (40) and further between the inner circumferential surface 71 of the cover (70) and the outer circumferential surface 62 of the cap (60) in front of the holders (40, 50). The embodiment therefore provides a suitable lathe capable of shortening the spindle.

Embodiment 3

Figure 2:
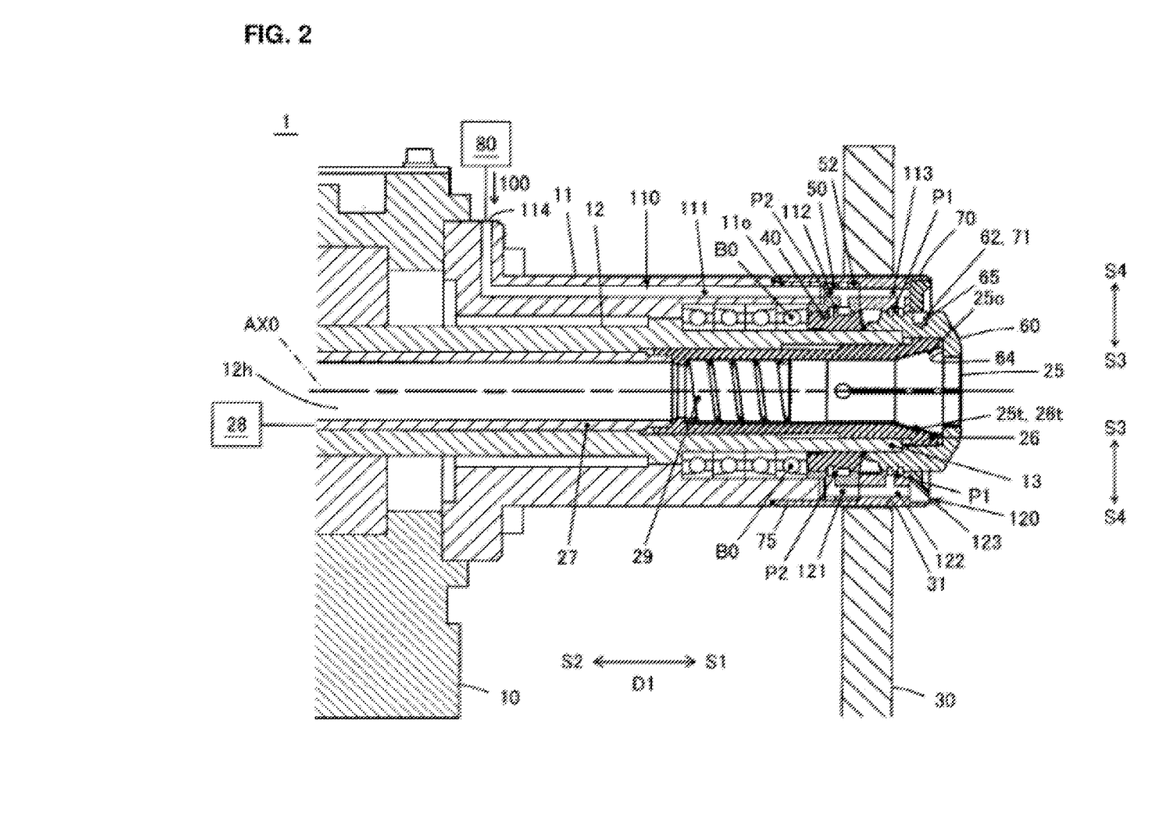
FIG. 2 is a vertical section view of primary part of the lathe without a guide bush.

As shown in FIG. 2, the lathe 1 may further comprise an air passage 110 connecting the spindle support 11, the outer ring holder (50), and the cover (70) to allow the purge air 100 to move through them to reach the first air purging unit P1. Such configuration can eliminate the need of an air inlet provided on the outer circumferential surface of the cover (70). The embodiment therefore provides a suitable lathe capable of supplying air to the first air purging unit.

Embodiment 4

Figure 3:
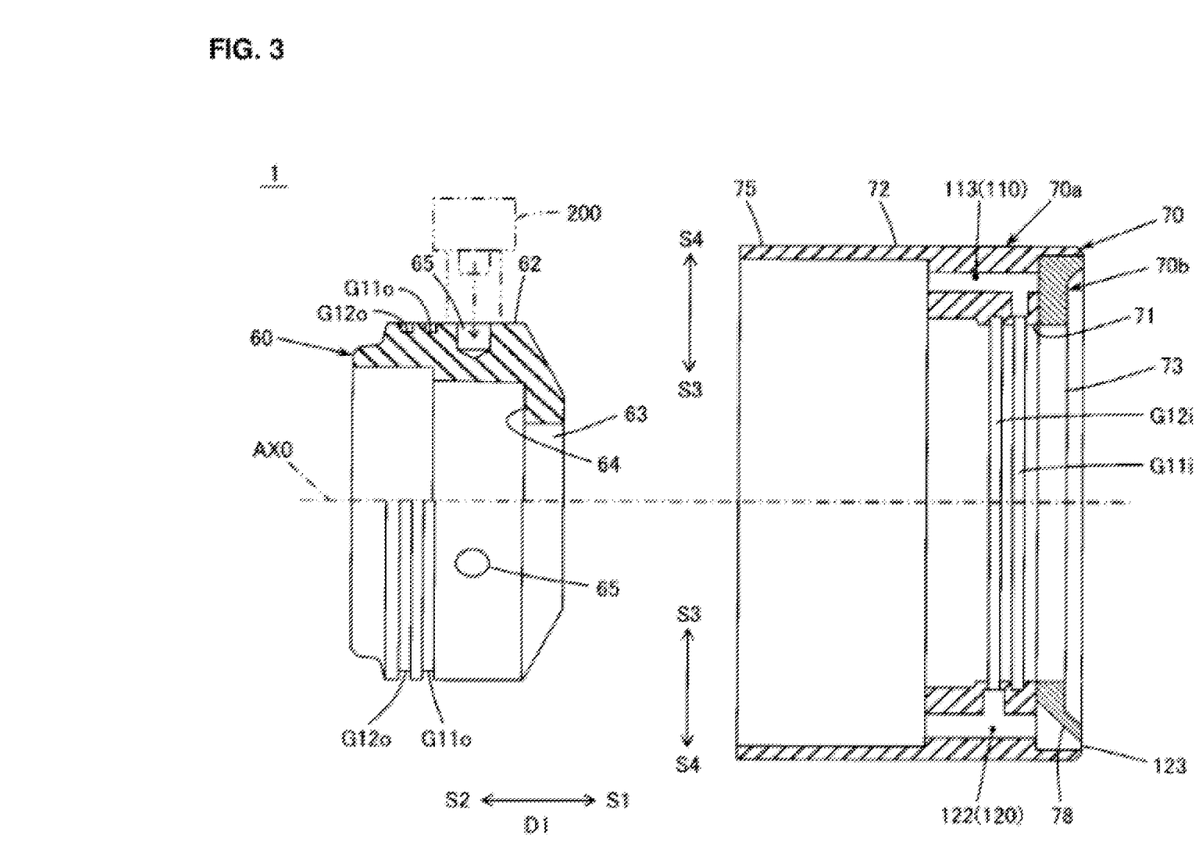
FIG. 3 is an exploded view of a cap and a cover.

As shown in FIG. 3, the cap (60) may have a hole 65 on the outer circumferential surface 62 to receive a detaching tool 200. When the cover (70) is removed from the spindle support 11, the operator can hook the detaching tool 200 on the hole 65 on the outer circumferential surface 62 of the cap 60. Such configuration provides a lathe capable of readily removing the cap.

Embodiment 5

Figure 1:
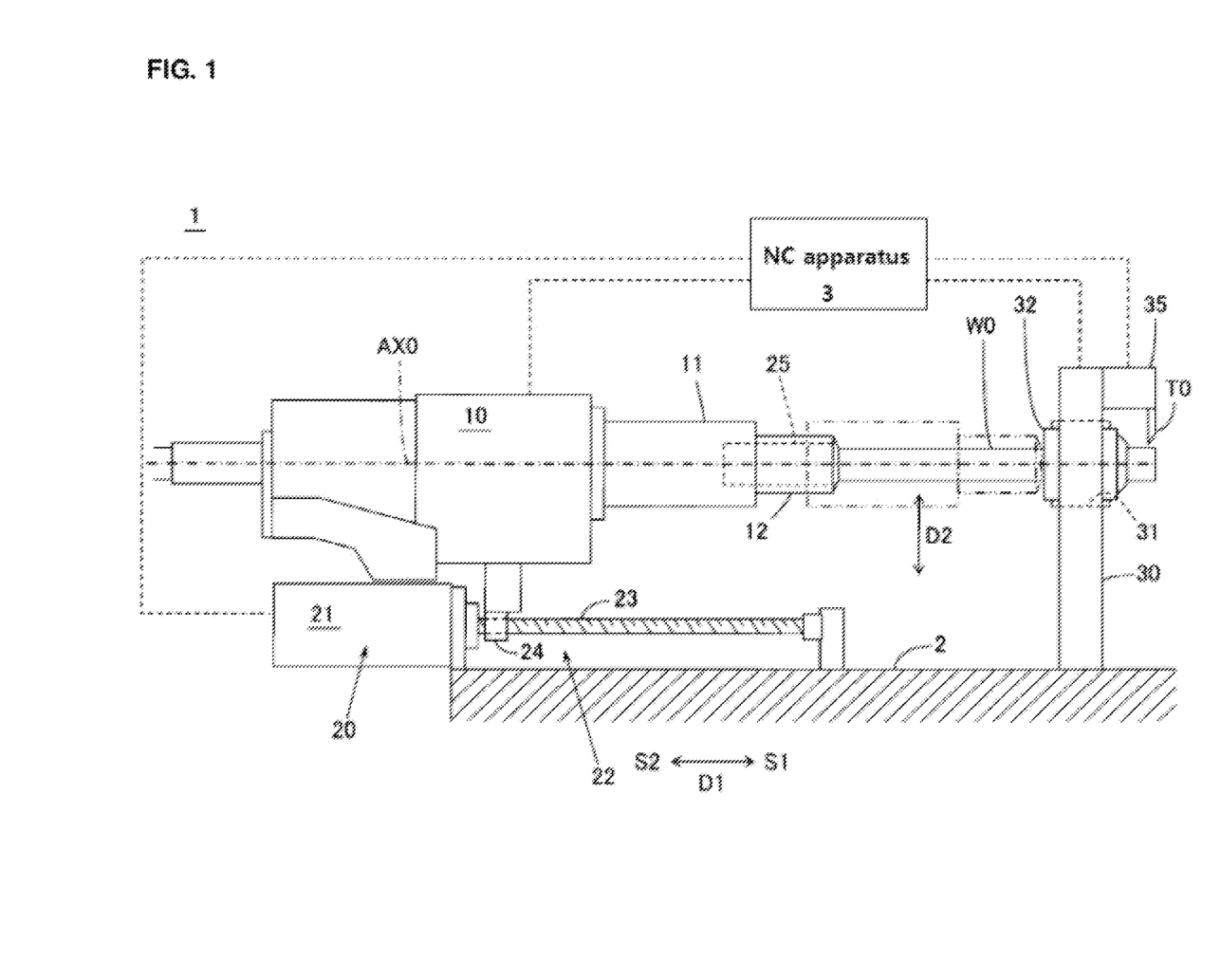
FIG. 1 is a block diagram schematically showing a configuration of a lathe provided with a guide bush.

As shown in FIG. 1, the lathe 1 may further comprise a supporting bed 30 for removably supporting a guide bush 32. The guide bush 32 may slidably support the workpiece W0 in front of the spindle 12. As shown in FIG. 2, when the guide bush 32 is removed from the supporting bed 30, the cover (70) mounted on the spindle support 11 may be disposed on the supporting bed 30. When the guide bush 32 is mounted on the supporting bed 30, the cover (70) may be removed from the spindle support 11.

The advanced position of the headstock 10 in the spindle axis direction D1 is on the rear side S2 when the guide bush is used compared to when the guide bush is not used. Accordingly, the distance between the machining position and the bearing B0 is longer when the guide bush is used compared to when the guide bush is not used. Further, the supporting bed 30 itself can block some chips and oil spread over the spindle 12. The cover (70) therefore can be removed in machining the workpiece when the guide bush is provided. Then, the cap (60) can be removed or attached without the need of removing or attaching the cover. The detaching tool receiving hole 65 on the outer circumferential surface 62 of the cap may always be exposed. The embodiment provides a lathe capable of readily detaching or attaching the cap when the guide bush is provided.

(2) Hardware Configuration of the Lathe

FIG. 1 schematically shows a configuration of an NC (numerical control) lathe 1 of sliding headstock type. FIG. 1 shows the state that the headstock 10 is in the most retracted position when the guide bush is used. FIG. 1 also shows by a two-dot line the position of the spindle support 11 and the spindle 12 when the headstock 10 is in the most advanced position when the guide bush is used. FIG. 2 schematically shows part of the lathe 1 when the guide bush is not used. The drawings show a spindle axis AX0, a horizontal spindle axis direction D1, a front side S1 in the spindle axis direction D1, a rear side S2 in the spindle axis direction D1, a vertical direction D2 perpendicular to the spindle axis direction D1, an inner side S3 with respect to the spindle axis AX0, and an outer side S4 with respect to the spindle axis AX0. FIG. 1 and FIG. 2 each shows only an example for explanation and the invention is therefore not limited thereto. A positional relation between elements is only an example for explanation. The left and right direction may be replaced by the up and down direction or the front and back direction. The up and down direction may be replaced by the left and right direction or the front and back direction. The front and back direction may be replaced by the left and right direction or the up and down direction. The rotational direction may be inversed. If something is the same as something in direction or position, they may be the same or almost the same within an error range.

The lathe 1 may comprise the headstock 10 provided with the spindle 12 holding the workpiece W0 with the collet 25, the guide bush supporting bed 30 provided with a tool post 35 holding one or more tools T0 to cut the workpiece W0, a headstock driving unit 20 driving the headstock 10 in the spindle axis direction D1, a tool post driving unit driving the tool post 35 in a direction perpendicular to the spindle axis direction D1 (a vertical direction D2 or a horizontal direction perpendicular to both directions D1 and D2, for example), a sleeve driving unit 28 opening and closing the collet 25, and an NC apparatus 3, which may be all mounted on a bed 2. Primary part of the bed 2, the headstock 10, the supporting bed 30, the tool post 35 and the tool T0 may be made of metal. The supporting bed 30 may have a through-hole 31 for receiving the guide bush 32. The NC apparatus 3 may comprise a RAM (Random Access Memory) storing an NC program, a ROM (Read Only Memory) storing an interpretive executing program for the NC program, a CPU (Central Processing Unit) executing the interpretive executing program, a timer circuit, and an interface. The NC apparatus 3 may control operation of the headstock 10, the tool post 35, the headstock driving unit 20, the tool post driving unit, and the sleeve driving unit 28 in accordance with the NC program.

The headstock 10 may be provided with the spindle support 11 through the bearing B0 on the outer side S4 of the spindle 12 with respect to the spindle axis AX0. The spindle support 11 may be also called a quill. The spindle 12 may releasably hold the cylindrical (bar) workpiece W0 with the collet 25. The workpiece may be inserted in a through-hole 12h provided in the spindle axis direction D1 on the spindle 12. The spindle 12 may be rotatable with the workpiece W0 on the spindle axis AX0 along the longitudinal direction of the workpiece W0. The tool post 35 may include a turret tool post and a gang tool post.

The headstock driving unit 20 may comprise a numerically controlled servo motor 21 and a ball screw 22 as shown in FIG. 1. The ball screw 22 may be a mechanical component comprising a threaded shaft 23 operably engaged with a nut 24 via balls (not shown). The threaded shaft 23 may be rotated on an axis along the spindle axis AX0 to move the nut 24 in the spindle axis direction D1. The motor 21 may be mounted on the bed 2 to drive the threaded shaft 23 in accordance with a commend from the NC apparatus 3. The headstock driving unit 20 may further has a structure (not shown) guiding the headstock 10 in the spindle axis direction D1 with respect to the bed 2. Such guiding structure and the ball screw 22 may move the headstock 10 in the spindle axis direction D1. The tool post driving unit may relatively move the tool post 35 in a direction perpendicular to the spindle axis direction D1 with respect to the guide bush supporting bed 30.

The guide bush 32 mounted on the supporting bed 30 may be disposed in front of the spindle 12 to slidably support the workpiece W0 passed through the spindle 12 in the spindle axis direction D1. The guide bush 32 may be rotated on the spindle axis AX0 in synchronization with the spindle 12. The guide bush 32 may be detachably mounted on the supporting bed 30. The guide bush 32 may prevent a possible bend of a long workpiece W0 for high precision machining. When the guide bush is used, the headstock 10 may be driven to move in the spindle axis direction D1 within a range behind the guide bush 32. When the guide bush 32 is used, longer part of the workpiece W0 is left uncut. The workpiece W0 that has been machined is not allowed to be retracted in the guide bush for another operation since the outer circumference thereof is supported by the guide bush 32. When the guide bush is removed, as shown in FIG. 2, the headstock 10 may be moved in the spindle axis direction D1 toward the supporting bed 30 to let the spindle 12 and the spindle support 11 into the through-hole 31. Accordingly, the spindle 12 can be movable in the spindle axis direction D1 within a range on the further front side S1 compared to when the guide bush is used. The guide bush of the invention may not be limited to the rotatable guide bush. A stationary guide bush may be used, too.

The lathe 1 may further have the collet 25, the inner ring fastener 40 (the inner ring holder), the outer ring presser 50 (the outer ring holder), the collet cap 60 (the cap), and the collet cap cover 70 (the cover) as shown in FIG. 2.

The collet 25 may be inserted to the through-hole 12h of the spindle 12 at the front end 13 thereof to hold and release the workpiece W0 under control of the NC apparatus 3. The collet 25 may have a tapered part 25t on the outer circumferential surface near the front end thereof. The tapered part

25t may be a tapered surface gradually apart from the spindle axis AX0 at the front end. The front end of the tapered part 25t may abut a front wall 64 of the collet cap 60 in the spindle axis direction D1. The collet 25 may be thereby blocked by the collet cap 60 attached to the spindle 12 so as not to fall forward from the front end 13 of the spindle 12. The front end of the collet 25 may be aligned with the front end of the collet cap 60 in the spindle axis direction D1. The lathe 1 may comprise a chuck sleeve 26, a push sleeve 27, a sleeve driving unit 28 and a compressed spring 29 to hold and release the workpiece W0 with the collet 25. The sleeves 26 and 27 and the spring 29 may be concentrically disposed with the spindle 12 in the through-hole 12h of the spindle 12.

The chuck sleeve 26 may have an inverted tapered part 26t on the inner circumferential surface of the front end thereof. The inverted tapered part 26t may be a tapered surface gradually apart from the spindle axis AX0 at the front end according to the tapered part 25t of the collet 25. The chuck sleeve 26 may be disposed outside the collet 25 with respect to the spindle axis AX0. The chuck sleeve 26 may be slidable in the spindle axis direction D1 to fasten the tapered part 25t of the collet 25 (into a closed state) when moved to the front side S1 and release the tapered part 25t (into an opened state) when moved to the rear side S2. The front end of the push sleeve 27 may be in contact with the rear end of the chuck sleeve 26. The rear end of the push sleeve 27 may be connected to the sleeve driving unit 28. The front end of the spring 29 may be hooked on the collet 25. The rear end of the spring 29 may be hooked on the inner circumference of the chuck sleeve 26 to apply rearward force to the chuck sleeve 26. The push sleeve 27 may be slidably moved in the spindle axis direction D1 to the front side S1 when driving force is applied from the sleeve driving unit 28. The push sleeve 27 may be slidably moved in the spindle axis direction D1 to the rear side S2 by rearward urging force of the spring 29 when the sleeve driving unit 28 is deactivated. Accordingly, the collet 25 may be brought into the closed state when the sleeves 26 and 27 are slidably moved to the front side S1 when the sleeve driving unit 28 is activated. The collet 25 may be brought into the opened state when the sleeves 26 and 27 are slidably moved to the rear side S2 when the sleeve driving unit 28 is deactivated.

Figure 5:
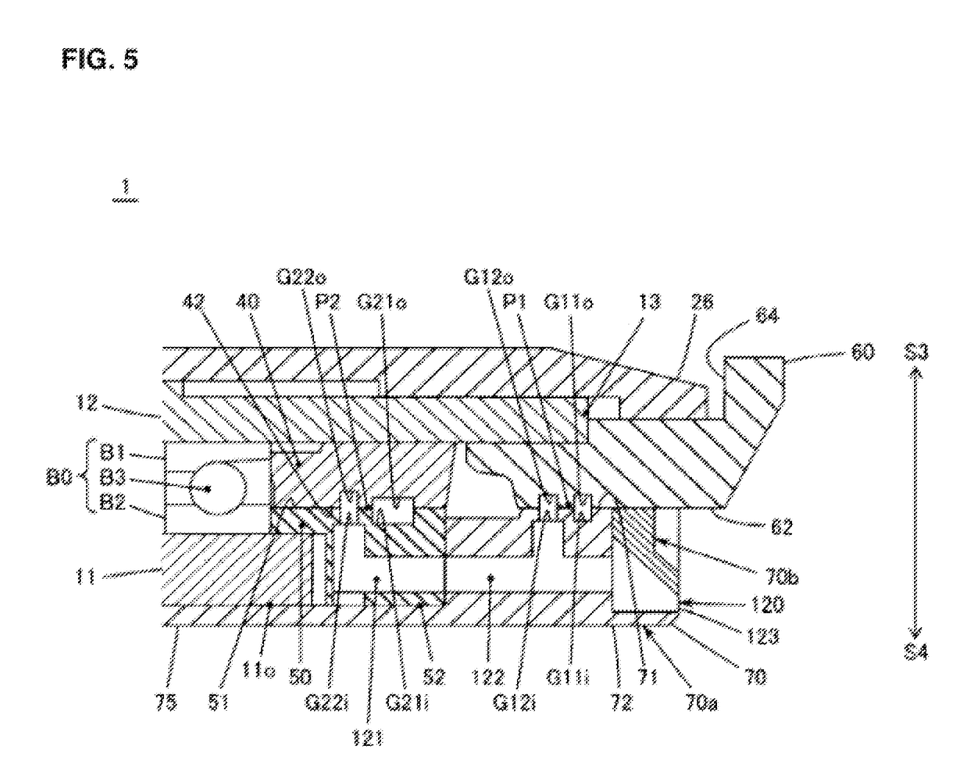
FIG. 5 is a vertical section view of an air purging unit and the surrounding area on an air outlet side.
Figure 6:
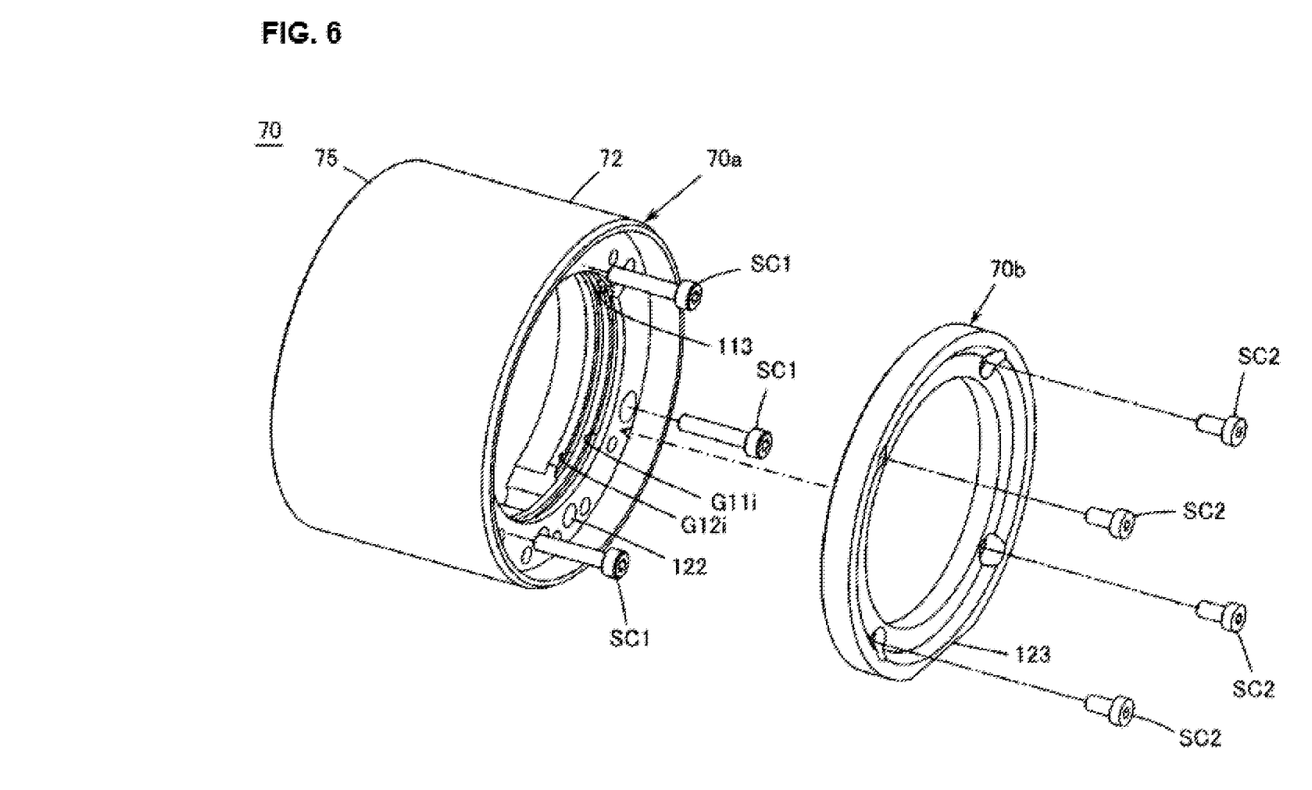
FIG. 6 is an exploded perspective view of the cover comprising a plurality of parts.

FIG. 3 schematically shows a vertical sectional view of an upper part of the collet cap 60, a side view of a lower part of the collet cap 60, and a vertical sectional view of the collet cap cover 70. The collet cap detaching tool 200 is shown by a two-dot line. FIG. 4 schematically shows the air purging units P1 and P2 and the surrounding area on the inlet side of the air 100. FIG. 5 schematically shows the air purging units P1 and P2 and the surrounding area on the outlet side of the air 100. FIG. 6 is an exploded perspective view of the cover 70 comprising a plurality of parts 70a and 70b. The lathe 1 is being described in detail referring to the drawings.

As shown in FIG. 4 and FIG. 5, the bearing B0 provided between the spindle support 11 and the spindle 12 may have a plurality of rolling elements B3 between an inner ring B1 and an outer ring B2. The rolling elements may be balls or rollers. The bearing B0 in the embodiment is a ball bearing having a plurality of balls, but a roller bearing having a plurality of rollers may be used instead.

The inner ring fastener 40 may be a nut fastening the inner ring B1 to a predetermined position in the spindle axis direction D1. The inner ring fastener 40 may be screwed into the outer circumferential surface of the spindle 12 to hold the front of the inner ring B1. The outer ring presser 50 may press the outer ring B2 to a predetermined position in the spindle axis direction D1. The outer ring presser 50 may be fixed to the front end of the spindle support 11 with, for example, a screw to hold the front of the outer ring B2 on the outer side of the inner ring fastener 40 with respect to the spindle axis AX0. The second air purging unit P2 receiving the purge air 100 may be provided between the inner circumferential surface 51 of the outer ring presser 50 and the outer circumferential surface 42 of the inner ring fastener 40. The second air purging unit P2 may have front grooves G21i and G21o connected to an air input passage (an air passage 112). The second air purging unit P2 may further have rear grooves G22i and G22o connected to an air output passage (an air passage 121 in FIG. 2). The outer circumferential grooves G21o and G22o may be arranged in the spindle axis direction D1 on the outer circumferential surface 42 of the inner ring fastener 40. The inner circumferential grooves G21i and G22i may be arranged in the spindle axis direction D1 on the inner circumferential surface 51 of the outer ring presser 50. The outer circumferential groove G21o may fit the inner circumferential grove G21i. The outer circumferential groove G22o may fit the inner circumferential groove G22i.

The collet cap 60 may be a collet holding nut provided at the front end 13 of the spindle 12. The collet cap 60 may be screwed into the outer circumferential surface of the spindle 12 in front of the inner ring fastener 40 and disposed on the outer side S4 of the collet 25 with respect to the spindle axis AX0. As shown in FIG. 3, the collet cap 60 may be provided with a through-hole 63 penetrating in the spindle axis direction D1. The front wall 64 of the collet cap 60 may be in contact with the front end of the tapered part 25t of the collet 25. The collet cap 60 may further have the outer circumferential grooves G11o and G12o and the detaching tool receiving hole 65 formed on the outer circumferential surface 62 with respect to the spindle axis AX0. The front end of the collet 25 may be disposed at the through-hole 63 of the collet cap 60 so that the front end of the collet can be seen through the through-hole 63 when viewed from the front side S1. The detaching tool receiving hole 65 may be recessed toward the inner side S3 from the outer circumferential surface 62 to receive the detaching tool 200 such as a hook spanner. The detaching tool receiving hole 65 may be provided at a plurality of positions on the outer circumferential surface 62 in the circumferential direction around the spindle axis AX0.

The collet cap cover 70 may protect the spindle 12 from chips and lubricant scattered from the workpiece W0 when the guide bush is not used. The collet cap cover 70 may have an inner circumferential surface 71 facing the outer circumferential surface 62 of the collet cap 60. The collet cap cover 70 may be removably mounted on the outer ring presser 50 with a screw. As shown in FIG. 6, the collet cap cover 70 may comprise a combination of the body 70a and the ring 70b. The body 70a having the air passages 113 and 122 and the inner circumferential grooves G11i and G12i may be mounted on the outer ring presser 50 with a plurality of screws SC1. The ring 70b may have a tapered D-cut part 78 (FIG. 3) which may form an air discharge port 123 in cooperation with the body 70a. The D-cut part 78 may be a tapered shape gradually wider toward the outer side S4 at the front side S1 so that the space between the ring 70b and the body 70a provided on the outer side S4 is gradually thinner at the front side S1. The ring 70b may be mounted on the body 70a with a plurality of screws SC2. Removing the screws SC2 and SC1 in that order allows the collet cap cover 70 to be detached from the outer ring presser 50. The tapered D-cut part of the ring 70b prevents the intrusion of chips and lubricant into the air passage 122 of the body 70a. The D-cut part 78 may be of any other shape as far as the intrusion is prevented. The combination of the plurality of parts 70a and 70b allows the collet cap cover 70 to be readily formed. The collet cap cover 70 may have a through-hole 73 penetrating in the spindle axis direction D1 and a mounting part 75 to be mounted outside the front end of the spindle support 11 as shown in FIG. 2. The front of the collet cap 60 may be protruded to the front side S1 from the through-hole 73 of the collet cap cover 70. The front end of the collet cap cover 70 mounted on the spindle support 11 may be disposed on the rear side S2 of the front end of the collet cap 60 in the spindle axis direction D1. The mounting part 75 of the collet cap cover 70 along with an outer periphery 11o of the front end of the spindle support 11 may cover the outer circumferential surface 52 of the outer ring presser 50. Such configuration prevents the intrusion of chips and lubricant from the outside of the inner ring fastener 40 and the outer ring presser 50 with respect to the spindle axis AX0. The collet cap cover 70 may be inserted to the through-hole 31 of the guide bush supporting bed 30 when the guide bush is not used. The through-hole 31 may have a seal member in contact with the outer circumferential surface 72. The through-hole 31 may have an air purging unit at the border of the through-hole 31 and the outer circumferential surface 72. Such configuration surely prevents the intrusion of chips and lubricant toward the headstock 10 from between the through-hole 31 and the outer circumferential surface 72 of the collet cap cover 70.

As shown in FIG. 2 and FIG. 4, the first air purging unit P1 may be formed between the inner circumferential surface 71 of the collet cap cover 70 and the outer circumferential surface 62 of the collet cap 60. The first air purging unit P1 may comprise the front grooves G11i and G11o connected to the air input passage (the air passage 113) and the rear grooves G12i and G12o connected to the air output passage (the air passage 122 in FIG. 2). The outer circumferential grooves G11o and G12o may be arranged in the spindle axis direction D1 on the outer circumferential surface 62 of the collet cap 60. The inner circumferential grooves G11i and G12i may be arranged in the spindle axis direction D1 on the inner circumferential surface 71 of the collet cap cover 70. The outer circumferential groove G11o may fit the inner circumferential groove G11i. The outer circumferential groove G12o may fit the inner circumferential groove G12i.

As shown in FIG. 2 and FIG. 4, the air passage 110 may be formed in the spindle support 11, the outer ring presser 50, and the collet cap cover 70. The air 100 from an air supply unit 80 may be supplied to the air purging units P1 and P2 through the air passage 110. The air 100 may be compressed air of higher pressure than the atmospheric pressure. The pressurized air 100 from the air supply unit 80 may enter the air passage 110 through an air supply port 114 of the spindle support 11. The air 100 may then enter the air passage 112 of the outer ring presser 50 and reach the front grooves G21i and G21o of the second air purging unit P2. The pressurized air 100 in the grooves G21i and G21o may move to the rear grooves G22i and G22o connected to the air passage 120 for discharge. The air 100 from the air passage 112 of the outer ring presser 50 may enter the air passage 113 of the collet cap cover 70 and reach the front grooves G11i and G11o of the first air purging unit P1. The pressurized air 100 in the grooves G11i and G11o may move to the rear grooves G12i and G12o connected to the air passage 120 for discharge. The air passage 110 may be used to supply the air 100 to the first air purging unit P1 through the spindle support 11, the outer ring presser 50, and the collet cap cover 70 in that order.

The air passage 120 for discharging the air 100 may be formed in the outer ring presser 50 and the collet cap cover 70. The air discharge port 123 of the collet cap cover 70 may be connected to the air passage 122 from the first air purging unit P1. The pressurized air 100 in the rear grooves G12i and G12o of the first air purging unit P1 may pass through the air passage 122 to be discharged from the air discharge port 123. The outer ring presser 50 may have the air passage 121 connecting the second air purging unit P2 to the air passage 122 of the collet cap cover 70. The pressurized air 100 in the rear grooves G22i and G22o of the second air purging unit P2 may pass through the air passages 121 and 122 in that order to be discharged from the air discharge port 123.

Figure 7:
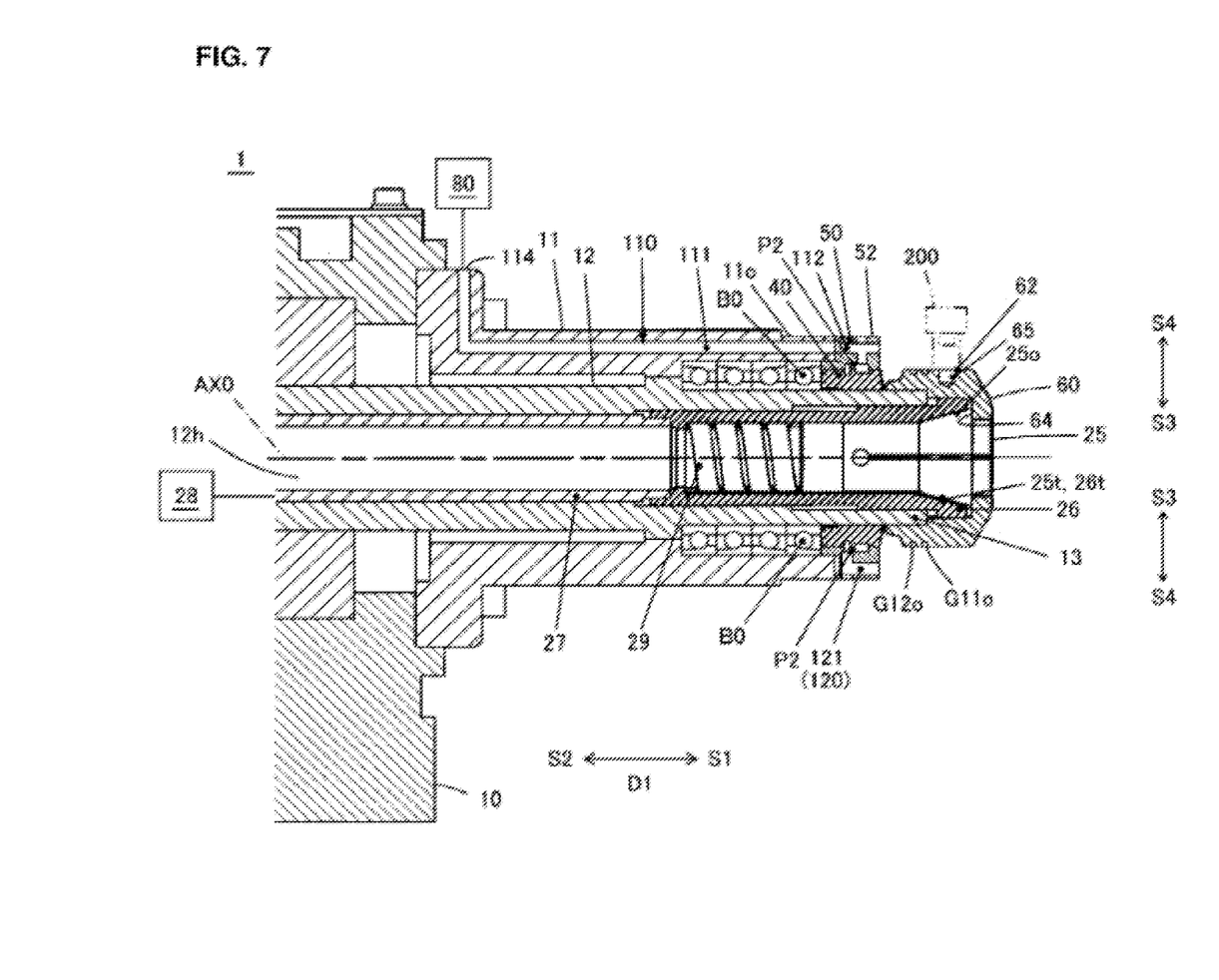
FIG. 7 is a vertical section view of primary part of the lathe provided with a guide bush.

The headstock 10 may be disposed on the further front side S1 when the guide bush 32 is not used compared to when the guide bush is used. The distance between the machining position and the bearing B0 is then shorter, which allows the cut chips and lubricant to easily invade the bearing B0. The advanced position of the headstock 10 in the spindle axis direction D1 may be disposed on the further rear side S2 when the guide bush 32 is used compared to when the guide bush is not used. The distance between the machining position and the bearing B0 is then longer. Further, the guide bush supporting bed 30 itself would prevent the cut chips and lubricant going into the spindle 12. Intrusion of the cut chips and lubricant into the bearing B0 is thereby prevented without supply of the air 100 to the air purging units P1 and P2. As shown in FIG. 7, the workpiece W0 can be machined even in the state that the collet cap cover 70 is removed from the spindle support 11. The collet cap 60 may be movable in the spindle axis direction D1 without interference with the guide bush 32. The collet cap cover 70, which may be retracted from the collet cap 60, never interferes with the guide bush 32. The workpiece W0 can be machined even in the state that the collet cap cover 70 is mounted on the spindle support 11.

The collet 25 depends on the workpiece W0 in size and therefore needs to be replaced. Replacing the collet is being described. First, the collet cap cover 70 may be removed from the spindle support 11 to disclose the detaching tool receiving hole 65 on the outer circumferential surface 62 of the collet cap 60. The detaching tool 200 may be put in the hole 65 to rotate the collet cap 60 for removal from the front end 13 of the spindle 12. A new collet 25 may be inserted into the through-hole 12h at the front end 13 of the spindle 12. The new collet 25 may be screwed into the front end 13 of the spindle 12. Replacing the collet 25 is thereby completed. When the guide bush is used, the workpiece W0 can be machined even in the state that the collet cap cover 70 is removed from the spindle support 11. When the guide bush is not used, the collet cap cover 70 may be mounted on the spindle support 11 and disposed at the through-hole 31 of the supporting bed 30.

(3) Effects of the Lathe of the Embodiment

As described above, the headstock 10 may be disposed on the further front side S1 when the guide bush is not used compared to when the guide bush is not used. The intrusion of the chips and lubricant into the bearing possibly happens due to a short distance between the machining position and the bearing B0. The inner circumferential grooves G11i and G12i of the collet cap cover 70 may constitute the first air purging unit P1 in cooperation with the collet cap 60 when the collet cap cover 70 is mounted on the spindle support 11. Air purging may be done between the inner circumferential surface 71 of the collet cap cover 70 and the outer circumferential surface 62 of the cap 60 in front of the holders (the inner ring fastener 40 and the outer ring presser 50) holding the front of the bearing B0 disposed between the spindle 12 and the spindle support 11. The intrusion of chips and lubricant into the bearing B0 is thereby prevented when the guide bush is not used. As shown in the upper half of FIG. 8, such configuration eliminates the need of providing a longer air purging unit in the holders (40, 50) in the spindle axis direction D1.

The upper half of FIG. 8 schematically shows a vertical section view of primary part of the lathe when the collet cap cover 70 is removed from the spindle support 11. The lower half of FIG. 8 schematically shows a vertical section view of primary part of the lathe 901 of a comparative example where cross-sections are not hatched only for visibility. In the lower half of FIG. 8, no air purging unit is provided between the collet cap cover 970 and the collet cap 960. Such configuration needs a plurality of air purging units between the outer ring presser 950 and the inner ring fastener 940, which increases the length of the holders 940 and 950 in the spindle axis direction D1 and thereby increases the length of the spindle 12.

In this embodiment, as shown in the upper half of FIG. 8, the first air purging unit P1 may be provided between the collet cap cover 70 and the collet cap 60. A single air purging unit may function enough when provided between the outer ring presser 50 and the inner ring fastener 40, which eliminates the need of longer holders (40, 50) in the spindle axis direction D1. The embodiment can provide a shortened spindle.

As shown in FIG. 3 and FIG. 7, the detaching tool receiving hole 65 may be provided on the outer circumferential surface 62 of the collet cap 60. When the collet cap cover 70 is removed from the spindle support 11, the collet cap 60 can be readily removed from the spindle 12 by using the detaching tool 200 such as a hook spanner. A complicated special tool requiring troublesome operation is not necessary. The embodiment provides a lathe capable of readily removing the collet cap when the collet is replaced.

Further, when the guide bush is used, machining on the workpiece is available in the state that the collet cap cover 70 has been removed from the spindle support 11. The collet cap 60 can be removed or attached without the need of removing or attaching the collet cap cover 70. The detaching tool receiving hole 65 on the outer circumferential surface 62 of the collet cap 60 may always be exposed. The embodiment provides a lathe capable of readily removing or attaching the collet cap 60 when the guide bush is used.

(4) Modifications

The invention may apply to an NC lathe of spindle stationary type. The lathe 1 of the embodiment may be switchable between the guide bush mode and the non guide bush mode. The invention may, however, apply to a lathe never provided with a guide bush. Such lathe still has the effect of shortening the spindle. The cap may be provided with the detaching tool receiving hole 65 on the outer circumferential surface 62 thereof. It may be replaced with another cap having a hole structure on the front end surface. The invention may apply to such cap still having the effect of shortening the spindle. The cover may be a combination of two parts. Instead, the cover may be a single part or a combination of three or more parts. The cap may be a single part. Instead, the cap may be a combination of two parts.

The lathe 1 of the embodiment may have the air passage 110 supplying the purge air 100 to the first air purging unit P1 from the supply port provided on the spindle support 11. The invention is not limited thereto. The supply port may be provided on the cover. Such configuration still has the effect of shortening the spindle.

The lathe 1 of the embodiment may have two-stage air purging units in the spindle axis direction D1. The invention is not limited thereto. Three or more stage sir purging units may be provided in the spindle axis direction D1. Instead, a plurality of air purging units may be provided between the cover and the cap in the spindle axis direction D1. The air purging unit between the inner ring holder and the outer ring holder can be eliminated as far as the chips and lubricant is prevented from going to the bearing provided between the spindle and the spindle support.

(5) Conclusion

As described above, the invention provides a lathe capable of shortening the spindle. The essential operations and effects of the invention may be available even from only the elements of independent claims. The elements disclosed in the embodiments may be mutually replaced or the combination thereof may be changed. The disclosed elements may be mutually replaced by prior art of the combination thereof may be changed. Such replacement and change may be within the scope of the invention.

What is claimed is:
1. A lathe comprising:
   a spindle rotatable on a spindle axis,
   a spindle support which supports the spindle through a bearing on an outer side of the spindle with respect to the spindle axis and includes an air passage extending along a direction of the spindle axis,
   a collet disposed on a front end of the spindle,
   an inner ring holder provided on the spindle to hold a front of an inner ring of the bearing,
   an outer ring holder provided on the spindle support to hold a front of an outer ring of the bearing on an outer side of the inner ring holder with respect to the spindle axis,
   a cap screwed into the spindle in front of the inner ring holder and disposed on an outer side of the collet with respect to the spindle axis,
   a cover detachably provided on the spindle support side, the cover having an inner circumferential surface facing an outer circumferential surface of the cap, and
   a first air purging unit provided between the inner circumferential surface of the cover and the outer circumferential surface of the cap, the first air purging unit being supplied with purge air through the air passage,
   wherein the air passage extends from a back side of the bearing toward the front end of the spindle, and the purge air flows toward the front end of the spindle from the back side of the bearing and passes between the inner circumferential surface of the cover and the outer circumferential surface of the cap.
2. A lathe of claim 1 further comprising a second air purging unit provided between an inner circumferential surface of the outer ring holder and an outer circumferential surface of the inner ring holder, the second air purging unit being supplied with the purge air.

3. A lathe of claim 2, wherein the air passage supplies the purge air to the first air purging unit through the spindle support, the outer ring holder, and the cover in that order.

4. A lathe of claim 3, wherein the cap is provided with a hole on the outer circumferential surface thereof to receive a detaching tool.

5. A lathe of claim 4 further comprising a supporting bed on which a guide bush is removably mounted, the guide bush slidably supporting a workpiece in front of the spindle,
wherein the cover mounted on the spindle support is disposed on the supporting bed when the guide bush is removed from the supporting bed, and
the cover is allowed to be removed from or mounted on the spindle support when the guide bush is mounted on the supporting bed.

6. A lathe of claim 3 further comprising a supporting bed on which a guide bush is removably mounted, the guide bush slidably supporting a workpiece in front of the spindle,
wherein the cover mounted on the spindle support is disposed on the supporting bed when the guide bush is removed from the supporting bed, and
the cover is allowed to be removed from or mounted on the spindle support when the guide bush is mounted on the supporting bed.

7. A lathe of claim 2, wherein the cap is provided with a hole on the outer circumferential surface thereof to receive a detaching tool.

8. A lathe of claim 7 further comprising a supporting bed on which a guide bush is removably mounted, the guide bush slidably supporting a workpiece in front of the spindle,
wherein the cover mounted on the spindle support is disposed on the supporting bed when the guide bush is removed from the supporting bed, and
the cover is allowed to be removed from or mounted on the spindle support when the guide bush is mounted on the supporting bed.

9. A lathe of claim 2 further comprising a supporting bed on which a guide bush is removably mounted, the guide bush slidably supporting a workpiece in front of the spindle,
wherein the cover mounted on the spindle support is disposed on the supporting bed when the guide bush is removed from the supporting bed, and
the cover is allowed to be removed from or mounted on the spindle support when the guide bush is mounted on the supporting bed.

10. A lathe of claim 1, wherein the air passage supplies the purge air to the first air purging unit through the spindle support, the outer ring holder, and the cover in that order.

11. A lathe of claim 10, wherein the cap is provided with a hole on the outer circumferential surface thereof to receive a detaching tool.

12. A lathe of claim 11 further comprising a supporting bed on which a guide bush is removably mounted, the guide bush slidably supporting a workpiece in front of the spindle,
wherein the cover mounted on the spindle support is disposed on the supporting bed when the guide bush is removed from the supporting bed, and
the cover is allowed to be removed from or mounted on the spindle support when the guide bush is mounted on the supporting bed.

13. A lathe of claim 10 further comprising a supporting bed on which a guide bush is removably mounted, the guide bush slidably supporting a workpiece in front of the spindle,
wherein the cover mounted on the spindle support is disposed on the supporting bed when the guide bush is removed from the supporting bed, and
the cover is allowed to be removed from or mounted on the spindle support when the guide bush is mounted on the supporting bed.

14. A lathe of claim 1, wherein the cap is provided with a hole on the outer circumferential surface thereof to receive a detaching tool.

15. A lathe of claim 14 further comprising a supporting bed on which a guide bush is removably mounted, the guide bush slidably supporting a workpiece in front of the spindle,
wherein the cover mounted on the spindle support is disposed on the supporting bed when the guide bush is removed from the supporting bed, and
the cover is allowed to be removed from or mounted on the spindle support when the guide bush is mounted on the supporting bed.

16. A lathe of claim 1 further comprising a supporting bed on which a guide bush is removably mounted, the guide bush slidably supporting a workpiece in front of the spindle,
wherein the cover mounted on the spindle support is disposed on the supporting bed when the guide bush is removed from the supporting bed, and
the cover is allowed to be removed from or mounted on the spindle support when the guide bush is mounted on the supporting bed.

* * * * *